H. SUNDHAUSSEN.
ADJUSTING APPARATUS.
APPLICATION FILED SEPT. 3, 1920.

1,366,433.

Patented Jan. 25, 1921.
2 SHEETS—SHEET 1.

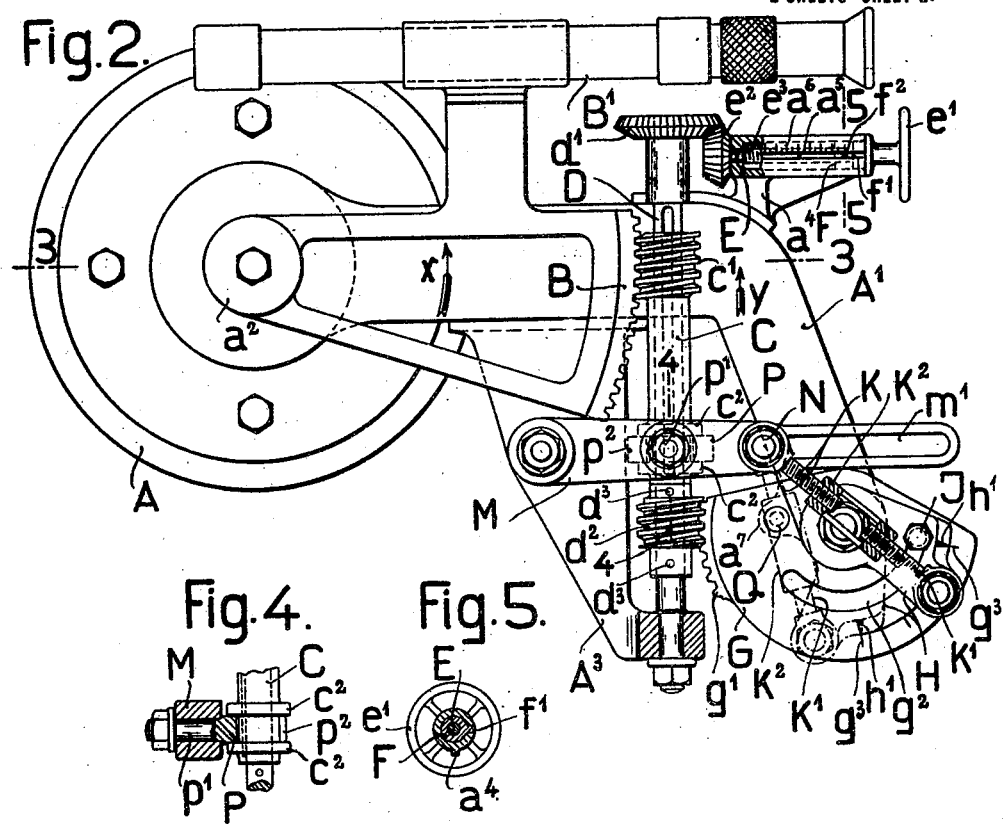

UNITED STATES PATENT OFFICE.

HERMANN SUNDHAUSSEN, OF ESSEN, GERMANY, ASSIGNOR TO FRIED. KRUPP AKTIENGESELLSCHAFT, OF ESSEN-ON-THE-RUHR, GERMANY.

ADJUSTING APPARATUS.

1,366,433.  Specification of Letters Patent.  Patented Jan. 25, 1921.

Application filed September 3, 1920. Serial No. 408,089.

*To all whom it may concern:*

Be it known that I, HERMANN SUNDHAUSSEN, residing at Essen, Germany, a citizen of the German Republic, have invented a certain new and useful Improvement in Adjusting Apparatus, of which the following is a specification.

This invention refers to an adjusting apparatus of a particularly readily accessible construction with a worm gearing and an arrangement for automatically regulating the adjustment effected by the rotation of the worm.

The drawings show an adjusting apparatus as an example of construction according to the present invention intended for ordnance sighting devices and which serves for the adjustment of the angle of the attachment corresponding to the range of the target and at the same time permits of taking into account the influence which the diminution of the initial velocity of the projectile due to erosion of the gun barrel has on the range of the gun.

The invention will be further described with reference to the accompanying drawings in which—

Fig. 2 is a similar view of the sighting device on a larger scale,

Fig. 3 is a section on the line 3—3 of Fig. 2, looking from above,

Fig. 4 is a section on the line 4—4 of Fig. 2, looking from the right and

Fig. 5 is a section on the line 5—5 of Fig. 2, looking from the left.

Figure 1:
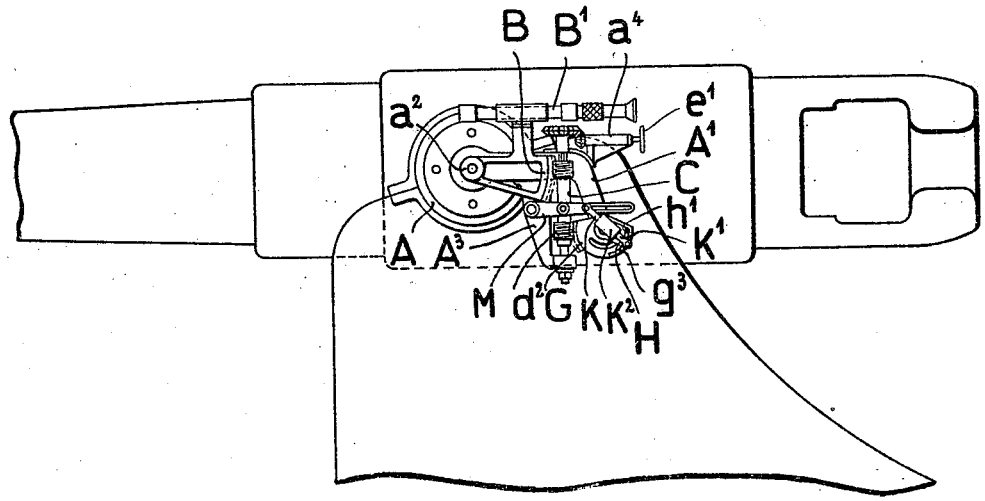
Figure 1 is a side elevation of the gun provided with the sighting device.

To one of the two trunnions A of a gun is rigidly attached an arm $A^1$, on which is rotatably mounted by means of a pin $a^2$ coaxial with the trunnions a toothed sector B, provided with a sighting telescope $B^1$, and with which toothed sector B gears a worm $c^1$ mounted on a hollow shaft C, which is movable longitudinally but cannot rotate upon a shaft D coaxial with it and which in its turn is mounted on the arm $A^1$ and a projection $A^3$ rigidly attached thereto. The shaft D is driven by means of a shaft E provided with a hand wheel $e^1$ and carried in a bearing bracket $a^4$ attached to the arm $A^1$ and positively connected by a bevel wheel gearing $e^2$ $d^1$ to the shaft D. The part of the shaft E, which is situated inside the bearing bracket $a^4$, is provided with a screw thread $e^3$ (see Fig. 2) and engages in a screw threaded nut F (see particularly Fig. 5) which is guided by a rib $f^1$ longitudinally in a slot $a^5$ (see Fig. 2) of the bearing bracket $a^4$, which rib $f^1$ carries a reading off mark $f^2$ for a range graduation $a^6$ arranged on the edge of the slot $a^5$. On the free end of the arm $A^1$ is rotatably mounted a sector G provided with a series of teeth $g^1$ with which gears a worm $d^2$ which is detachably connected to the shaft D by means of two pins $d^3$. With the sector G is rotatably connected a crank arm H arranged coaxially therewith and which crank arm by means of a clamping screw J passing through a sector-shaped slot $g^2$ (see Fig. 2) in the sector G can be secured in various angular positions relatively to the sector. The various angular positions are indicated by a number of line marks $g^3$ arranged on the edge of the sector and corresponding to the different values of the initial velocity of the projectiles, and to which marks a graduation $h^1$ on the crank arm H can be set. To the crank arm H is attached one end of a connecting rod, which consists of two screw spindles K and $K^1$ with threads of opposite pitch and a screw-threaded sleeve $K^2$, which connects both spindles, and by the rotation of which the connecting rod can be adjusted to different lengths. The other end of the connecting rod is attached to a crank arm, which is mounted on the projection $A^3$ of the arm $A^1$ and which is connected to the connecting rod by a link pin N, which is adjustable in a radial slot $m^1$ (see Fig. 2) in the crank arm M at various distances relatively to the axis of rotation of the crank arm. According as the angular position of the crank arm H relatively to the distance of the link bolt N from the axis of rotation of the crank arm M, changes so the law according to which the rotation transmitted by the worm gearing $d^2$ $g^1$ to the sector G is transmitted by it by connecting rods K $K^1$ $K^2$ to the crank arm M is different. The crank gear G H, K $K^1$ $K^2$ N M, $A^3$ $A^1$ accordingly forms a change speed gear, which is adjustable by various methods of transmission of movement. The crank arm M is connected to the hollow shaft C by a fork P rotatably mounted thereon by means of a pin $p^1$ the arms $p^2$ of the said fork embracing the hollow shaft with a certain amount of play, and being guided between two collars $c^2$ mounted thereon (see Figs. 2 and 4). A rotation of the crank arm M therefore produces a movement of the hollow shaft C on the shaft D, and when this movement takes place, the hollow shaft in consequence of its connection with the shaft D is compelled to take part in its rotation at the same time. The toothed sector B will therefore have imparted to it by the worm $c^1$ rigidly connected to the hollow shaft C, a rotation, which is composed of the principal movement effected by the rotation of the worm and a regulating movement effected by the axial movement of the worm. As will be seen from the foregoing the principal movement arising from the rotation of the worm $c^1$ independent of the adjustment is imparted by the change speed gear G H K $K^1$ $K^2$ N M $A^3$ $A^1$, whereas the regulating movement is dependent upon the kind of movement transmission to which the change speed is set. The sector G is adapted to be locked relatively to the arm $A^1$ in the angular position shown in the drawing in which the reading off mark $f^2$ on the nut F connected to the sector G points to the beginning point of the graduation $a^6$, which corresponds to the target distance zero, by means of a bolt Q which is to be passed through a hole in the sector and an eye $a^7$ in the arm $A^1$.

As long as the gun barrel only shows infinitesimal erosion and therefore the initial velocity of the projectile retains substantially its original value, the worm $d^2$ is not yet fixed to the shaft D, and the disk G is locked by the bolt Q relatively to the arm $A^1$. Furthermore the crank arm M is secured in an angular position, which will be determined in the manner to be hereinafter described. For this purpose the shaft D is first so adjusted by turning the hand wheel $e^1$ that the reading off mark $f^2$ points to the point of commencement of the graduation $a^6$. Then with the angular position imparted to the shaft D the crank arm M is so adjusted by moving the crank gear H, K $K^1$ $K^2$, M $A^3$ $A^1$, that the hollow shaft C with the worm $c^1$ is brought to a height at which the sighting line of the telescope $B^1$, which on the movement of the hollow shaft C due to the engagement of the worm $c^1$ in the toothed sector B rotates in a vertical direction, is parallel with the gun barrel. The movement of the crank gear, which is necessary, in order to bring the crank arm M into the angular position described, may here be effected for example by locking the crank H relatively to the sector G and the link bolt N relatively to the crank arm M after adjusting the length of the connecting rod K $K^1$ $K^2$ by rotating the screw-threaded sleeve $K^2$. The position in which after this movement the crank arm H is locked relatively to the disk and the link bolt N relatively to the crank arm M is such as may be desired.

The adjustment of the sighting device to the position corresponding to the original value of the initial velocity is now completed. In consequence of the omission of the worm $d^2$ and owing to the locking of the sector G, the crank arm M, when the hand wheel $e^1$ is rotated for the purpose of adjusting the sighting device to the angle of the attachment corresponding to the range of the target, remains at rest, so that no movement of the hollow shaft C along the shaft D driven by the rotation of the hand wheel $e^1$ can take place. The hollow shaft C which is connected to the shaft D so as to be incapable of rotating and also the worm $c^1$ therefore behave just as if they were rigidly connected to the shaft D. The toothed sector B is therefore rotated through an angle proportionally equal to the angle of rotation of the hand wheel $e^1$ in the direction of the arrow $x$ and the sighting line, as soon as the reading off mark $f^2$ is opposite the graduation mark of the graduation $a^6$ which corresponds to the desired range of the target, has received the inclination relatively to the longitudinal axis of the gun which corresponds to this range of the target.

As soon as the initial velocity of the projectiles has dropped owing to erosion of the gun barrel, to a certain value to which the line mark $g^3$ located on the extreme right of the sector G corresponds, the crank arm H, if this has not already been done before, is locked in such a position relatively to the sector G that the mark $h^1$ becomes opposite the said line mark $g^3$. Furthermore the link bolt N is locked, if this has not already been done, to the inner ends of the slot $m^1$. In addition to this, after the shaft D has again been turned back so far, that the mark $f^2$ points to the point of commencement of the graduation $a^6$, the worm $d^2$ is now locked to the shaft D and brought into engagement with the teeth of the sector G provisionally still locked by the bolt Q. Finally by turning the screw threaded sleeve $K^2$ the hollow shaft C with the worm $c^1$ is moved so far along the stationary shaft D by means of the crank arm M, that on the rotation of the toothed sector B, which takes place herewith, the sighting line of the telescope $B^1$ is again parallel with the longitudinal axis of the gun barrel. The bolt Q, which effects the locking of the sector G is now removed and the sighting device is then again ready for use for the adjustment of the angle of the attachment corresponding to the range of the target.

If now, by turning the hand wheel $e^1$, the reading off mark $f^2$ be again adjusted to the same graduation mark of the graduation $a^6$ as before, the shaft D and the hollow shaft C with the worm $c^1$ would have rotated through the same angle as in the first case. At the time however the hollow shaft C with the worm $c^1$ has been moved a certain distance in the direction of the arrow $y$ by the gearing D $d^2$ $g^1$ G H K $K^1$ $K^2$ N M P so that the toothed sector is first rotated owing to the rotation of the worm $c^1$ through the same angle as in the first adjustment and then owing to the continued rotation of the worm it is rotated through a certain additional angle in the direction of the arrow $z$. By suitable arrangement of the dimensions of the crank gearing G H, K $K^1$ $K^2$ N M $A^3$ $A^1$ it can be insured with sufficient accuracy that for each range of the target adjusted on the graduation $a^6$, this additional angle is equal to the angle through which, owing to the diminution of the initial velocity of the projectiles, the angle of the attachment must be increased.

If the erosion of the gun barrel has reached such an extent, that the initial velocity has dropped to a value to which the next line mark $g^3$ corresponds the crank arm H is locked in such a position relatively to the sector G, that the mark $h^1$ points to this line mark $g^3$. Furthermore the crank arm M is again so adjusted in the manner above described by rotating the screw-threaded sleeve $K^2$, that the sighting line is parallel to the longitudinal axis of the gun barrel, when the mark $f^2$ points to the point of commencement of the graduation $a^6$. The additional angle by which the angle of the attachment corresponding in this case to the original initial velocity is increased is greater than in the previous case to correspond to the diminution of the initial velocity.

After the crank arm H, on the continuance of the erosion, has been brought into a position (indicated by dot and dash lines in Fig. 2) in which the mark $h^1$ points to the line mark situated on the extreme left, allowance may finally be made for further erosion by locking the bolt N at a greater distance from the axis of rotation of the crank M.

Claims.

1. An adjusting apparatus for ordnance sighting devices which comprises a sighting telescope, a carrier for said telescope, a worm gearing for moving said carrier and means for axially shifting said worm gearing.

2. An adjusting apparatus for ordnance sighting devices which comprises a sighting telescope, a toothed sector-shaped holder for said telescope, a worm gearing meshing with said telescope holder for adjusting said telescope, adjustable means for variably shifting said worm gearing axially.

3. An adjusting apparatus for ordnance sighting devices comprising an arm rigidly attached to one of the trunnions of a gun, a sector-shaped member mounted for rotation upon said arm, a sighting telescope supported by said sector-shaped member, an axially movable worm for operating said sector-shaped member, means for rotating said worm, said means embodying a range indicating device, and an adjustable device connectible to said worm to move the same axially to compensate for the diminution of the initial velocity of the projectiles due to erosion of the gun barrel, substantially as described.

4. An adjusting apparatus for ordnance sighting devices comprises an arm rigidly attached to one of the trunnions of a gun, a sector-shaped member mounted for rotation upon said arm, a sighting telescope supported by said sector-shaped member, an axially movable worm for operating said sector-shaped member, means for rotating said worm, said means embodying a range indicating device, a means for moving the worm axially which comprises a crank arm, a rotatable sector, a second crank arm adjustably mounted with respect to said sector, a worm meshing with said sector and means adjustably connecting said first mentioned crank arm to said second crank arm, substantially as and for the purpose set forth.

5. An adjusting apparatus for ordnance sighting devices comprising an adjustable sighting means carrier, a toothed member positively connected to said sighting means carrier, a driving shaft for adjusting said toothed member, a worm gear movable on said driving shaft in axial direction, means coupling the worm gear to said driving shaft with respect to rotary movement, said worm gear engaging said toothed member, a rotatable sector positively connected to said driving shaft, a crank arm adjustable relatively to said sector, a second crank arm positively connected to said worm gear for shifting it axially, and a rod of adjustable length pivotally connected to both crank arms.

6. An adjusting apparatus for ordnance sighting devices comprising an adjustable sighting means carrier, a toothed member positively connected to said sighting means carrier, a driving shaft for adjusting said toothed member, a worm gear movable on said driving shaft in axial direction, means coupling the worm gear to said driving shaft with respect to rotary movement, said worm gear engaging said toothed member, a rotatable sector positively connected to said driving shaft, a crank arm adjustable relatively to said sector, a second crank arm positively connected to said worm gear for shifting it axially, and a rod of adjustable length pivotally connected to both crank arms, one of said crank arms also being of adjustable length.

7. An adjusting apparatus for ordnance sighting devices comprising an adjustable sighting means carrier, a toothed member positively connected to said sighting means carrier, a driving shaft for adjusting said toothed member, a worm gear movable on said driving shaft in axial direction, means coupling the worm gear to said driving shaft with respect to rotary movement, said worm gear engaging said toothed member, a rotatable sector positively connected to said driving shaft, a crank arm adjustable relatively to said sector, a second crank arm positively connected to said worm gear for shifting it axially, and a rod of adjustable length pivotally connected to both crank arms, said second crank arm also being of adjustable length.

The foregoing specification signed at Essen, Germany, this 20th day of May, 1920.

HERMANN SUNDHAUSSEN.

In presence of—
 HANS GOTTSMANN,
 JOSEF OLBERTZ.